United States Patent [19]
Welti et al.

[11] Patent Number: 5,696,539
[45] Date of Patent: Dec. 9, 1997

[54] METHOD FOR MATCHING COLORS OF DATA DISPLAYED ON CONNECTED COMPUTER SYSTEMS

[75] Inventors: Bruce C. Welti; Daniel Garfinkel; Thomas W. Yip, all of Ft. Collins, Colo.

[73] Assignee: Hewlett-Packard Company, Palo Alto, Calif.

[21] Appl. No.: 371,673

[22] Filed: Jan. 11, 1995

Related U.S. Application Data

[63] Continuation of Ser. No. 164,172, Dec. 8, 1993, abandoned.
[51] Int. Cl.[6] .................................................. G09G 5/06
[52] U.S. Cl. ................................................ 345/199; 345/1
[58] Field of Search ............................... 345/115, 150, 345/153, 185, 186, 187, 199, 1, 2; 348/32, 422; 382/17, 162, 164, 165; H04N 9/43

[56] References Cited

U.S. PATENT DOCUMENTS

| | | | |
|---|---|---|---|
| 4,121,283 | 10/1978 | Walker | 345/150 |
| 4,586,158 | 4/1986 | Brandle | 345/115 |
| 4,769,702 | 9/1988 | Lievre | 348/422 |
| 5,032,904 | 7/1991 | Murai | 382/17 |
| 5,130,701 | 7/1992 | White | 348/32 |
| 5,241,609 | 8/1993 | Hasebe | 382/17 |
| 5,272,468 | 12/1993 | Read | 345/153 |
| 5,283,554 | 2/1994 | Edelson | 345/153 |

OTHER PUBLICATIONS

Kong, Y et al. "The Piecewise Linear Neural Network". IJCNN 3:245-50, 17-21 Jun. 1990.
Sayeh, M.R. et al. "Design of Unsupervised Classifier" IJCNN 2:417-22. 1991. Seattle.
Kohonen, T. "The Self Organizing Map". Proc IEEE 78(9):1464-1480 Sep. 1990.
Orchard, M., Bouman, C. "Color Quantization of Images". IEEE Trans Signal Processing 39(12):2677-2690.

*Primary Examiner*—Chanh Nguyen

[57] ABSTRACT

A system that translates the color of a pixel being displayed in a first visual type into a comparably colored pixel for a second visual type. The system first allocates a ramp of colors evenly distributed over the color palette of the second visual type, with the ramp occupying half of the colormap in the second visual type. For each pixel displayed on the first visual type, the colors of the pixel are matched to the ramp and if a close color is in the ramp, it is displayed on the second visual type. If no ramp color is sufficiently close, a new color is allocated in the colormap of the second visual type, if possible. Color translations are retained and used again when possible. When read-only and read-write classes of colors are used, a corresponding class is defined in the second visual type's colormap.

14 Claims, 8 Drawing Sheets

METHOD FOR MATCHING COLORS OF DATA DISPLAYED ON CONNECTED COMPUTER SYSTEMS

CROSS REFERENCE TO RELATED APPLICATION

This is a continuation of application Ser. No. 08/164,172 filed on Dec. 8, 1993, now abandoned.

FIELD OF THE INVENTION

This invention relates to computer systems and more particularly to display software executing within a computer system. Even more particularly, the invention relates to matching colors of data displayed on display devices connected to computer systems.

BACKGROUND OF THE INVENTION

When an application displays data to a display device, it must display using display parameters that fit the display device. A set of display parameters is often called a "visual type", and several visual types are commonly used. In the X window system, used with the Unix Operating System, and other operating systems, there are six different visual types defined: static gray, gray scale, static color, pseudo color, true color, and direct color. A problem exists if the application is programmed to display in one visual type, but the display device is a different visual type.

One example of this situation occurs when an application in a first computer displays data in a window on the first computer, but also displays the data in a window on a second computer or many other computers. The first computer is typically a "sender" of the window, that is, it originally created the window and displays data into the window. The other computer systems are "receivers", since they simply display the window data as it is received. The problem occurs when the sending computer and the receiving computers use different visual types.

Each of the visual types described above uses some form of colormap to map a pixel to the various colors on the screen, although the colormap may be very simple in the case of a monochrome display. That is, a colormap provides a way of translating a pixel value as sent to the display into the actual red, green, and blue color combinations that are displayed on a color display, or into an intensity level for a monochrome display. In three of the visual types, static gray, static color, and true color, the colormap cannot be changed. In the other three visual types, gray scale, pseudo color, and direct color, the colormap is changeable by the user of the system. In static gray and gray scale, the colormap typically has few entries, for example, 256 total entries. That is, these types of displays can display 256 intensity levels of gray. Static color and pseudo color typically have an eight plane colormap, allowing 256 different entries, each of which may have a separate specification for red, green and blue. Thus the pseudo color and static color displays can display 256 different colors out of a larger palette. The palette of available colors is dependent upon the number of bits used to represent red, green and blue. For example, if red, green and blue are each represented by four bits, the palette would be composed of 4096 different possible colors. Many computers today use eight bits each to represent red, green and blue, therefore, the palette is more than sixteen million different colors. Direct color and true color allow the full range of the palette to be displayed; thus, typically, they can display over sixteen million colors.

Another problem exists after a pixel has been translated from the sender's color into the receiver's color. Once the translation has been performed, the translated data should be saved so that future displays of this color will not require another translation. If the application's color map is small, that is, less than 1024 entries, the translated data can be saved in a simple table having no more than 1024 entries. If the application's visual type is large, such as with direct color or true color, the size of the table would be impractical.

One prior art method, called dithering, varies the colors in a second visual type by blending the colors over an area of the graphic displayed on the second visual type. This requires that the entire graphic being displayed be available before the dithering can be performed. Often in displaying graphics the entire graphic is not available.

There is need in the art, then, for a system to translate pixels being displayed from an application using one visual type to a display device using a different visual type. There is a further need for such a system that retains the translated data in a practical form, to avoid additional translations of the same pixel color. A still further need is for such a system that translates each pixel independently of other pixels in the graphic image. The present invention meets these and other needs.

SUMMARY OF THE INVENTION

It is an aspect of the invention to match colors of data displayed from an application using one visual type to a display device using another visual type.

Another aspect of the invention is to match colors of each pixel individually without knowledge of other pixel colors in the image being displayed.

A further aspect of the invention is to save translated data and reuse the translated data for additional displays of the same pixel color.

These and other aspects of the invention are accomplished in a system that translates the color of a pixel being displayed by an application program using one visual type into a comparable color pixel for display on a display device that uses a different visual type. One example of this occurs when an application displays a window on multiple computers, each of which may have a different display device visual type.

This translation is accomplished by first allocating a ramp of colors within each display device when the connection between the application and the display device is established. The ramp provides a variety of colors over the entire spectrum, but typically uses less than half of the colormap of the display device. When the application displays a pixel, the colors of the pixel are matched to colors in the ramp and to previously allocated read-only colors within the display device colormap to determine whether a color within the display device colormap is sufficiently close to the application's pixel color. If such a close color exists within the ramp or previously allocated read-only colors, the color is sent to the display. If no ramp or previously allocated read-only color is sufficiently close, a test is made to determine whether a new read-only color can be allocated within the colormap of the display. If a new read-only color can be allocated within the display's colormap, such a color is allocated and used. If no new read-only color can be allocated in the display, the closest matching color within the ramp, or within any other previously allocated colors in the colormap, is used on the display.

Once a color translation from the application to the display is established for a particular pixel color, it is stored and used thereafter when that same color is displayed by the application. Thus, the translation only has to occur once for a particular color being displayed. When the display is direct or true color, the red, green, and blue values are reduced to four bits each, so that the translated color can be stored in a table of only 4096 entries.

The system distinguishes between read-only classes of colors, and read-write classes of colors within the display's colormap. Within a colormap on a display device, some of the space may be allocated as read-only, thus it may not be changed by each individual process on the system. Other colors, however, are designated as read-write and may be changed at any time within the execution of a process. Therefore, a corresponding class will be used within the display when possible.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
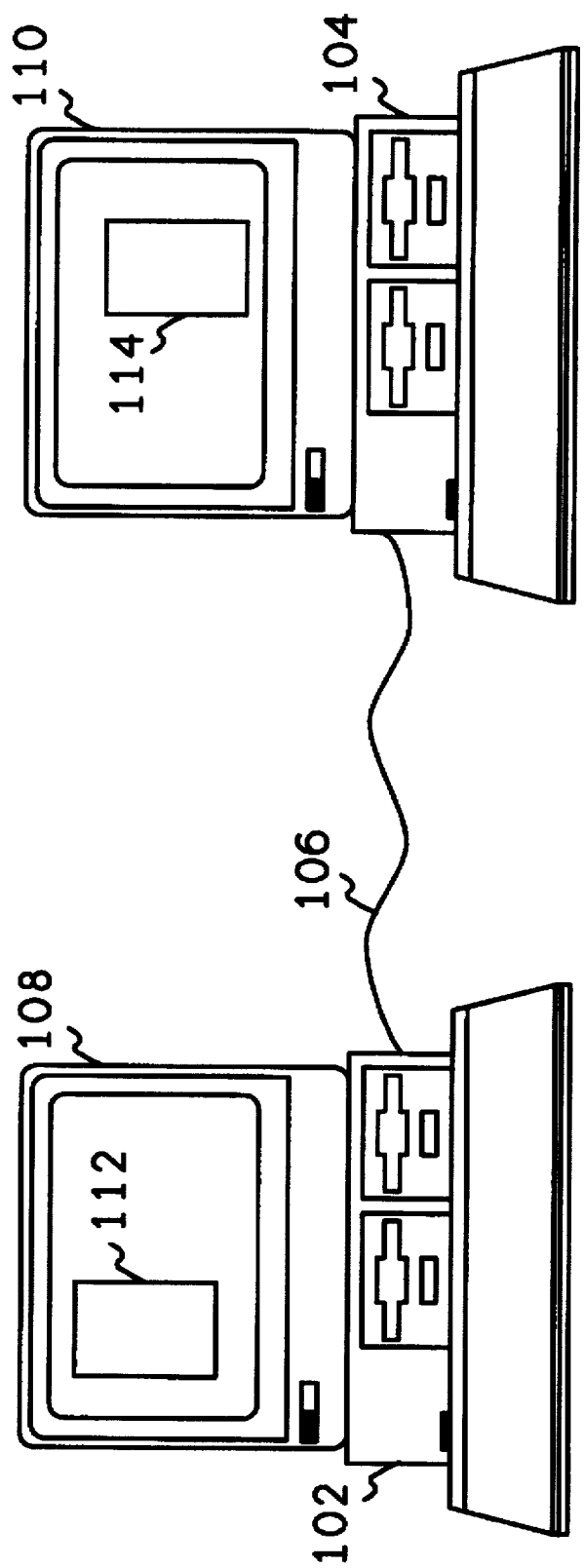
FIG. 1 shows a diagram of two computer systems sharing a window.

The following description is of the best presently contemplated mode of carrying out the present invention. This description is not to be taken in a limiting sense but is made merely for the purpose of describing the general principles of the invention. The scope of the invention should be determined by referencing the appended claims.

When an application displays data on a display device, the application may be using a "visual type" different from the visual type of the display device, so a pixel color may have to be translated from the colors in one visual type to the colors within a second visual type. This process is further complicated when the application displays data into a window shared between multiple computers, each of which may have a different visual type. Within the X window display system, there are six different visual types: static gray, gray scale, static color, pseudo color, true color, and direct color. When sharing a window from one computer system, the sender, to another computer system, the receiver, each drawing request in the sender is "echoed" to the receiver. Thus, an equivalent display request is made on both systems. If the different systems have different visual types, the display request must be translated from the sender's visual type into the receiver's visual type. The translation is simple for the extremes of visual types: if the receiver uses a monochrome visual type, then each sender pixel color maps into either black or white; if the receiver uses a twenty-four plane true color visual type, the sender color is translated directly into the receiver color, and since the receiver is capable of displaying all possible sender colors, an exact match is guaranteed. Between the other visual types, however, the translation must be effective and efficient.

The most common case in between these extremes is a receiver with eight plane pseudo color. That is, each pixel being displayed in the receiver is comprised of eight bits, sometimes called planes, thus the receiver's colormap contains 256 different locations. For this case, the present invention uses a "ramp", which is a set of colors evenly distributed throughout the color space of the receiver. This ramp comprises all combinations of four evenly spaced values of red, eight values of green, and four values of blue, for a total of 4×8×4 or 128 colors. Thus, the ramp takes up half of the available colors in the receiver's colormap. Those skilled in the art will recognize that ramps comprising other spacings of colors could also be used, including ramps where the colors are unevenly spaced.

The benefit of using the ramp is that any color being displayed on the sender will always be within some distance in the color space from a color within the ramp. This minimizes the possible error between the two colors; however, the error may still be larger than desirable. Therefore, the ramp is a "fall-back" if the system cannot perform a better translation for a particular pixel.

The ramp is created on the receiver system when window sharing is initiated. Each pixel is then translated individually. Each time a pixel is displayed on the sender, the present invention first determines whether the pixel has already been mapped to a color on the receiver. If so, the color that has been mapped is sent to the receiver to be displayed. If the color has not yet been mapped, and the sender is using a read-write location within its colormap, the invention tries to allocate a matching read-write location in the receiver's colormap. If the allocation is possible, the color is allocated in the receiver's colormap and subsequently displayed. If the allocation fails, that is, there are no more read-write locations available in the receiver's colormap, then the color is treated as if it were a read-only color.

If the color is read-only, the system first determines if any existing read-only color is "close enough", as defined below. Read-write colors can be changed at any time by the application and there is no guarantee that a pixel will not change during execution of the application, so the system does not try to use the same receiver color for multiple sender colors. For read-only colors, however, use of close colors can conserve the usually limited supply of color cells, so the system calculates the difference between the sender color and its closest match within the ramp of the colormap of the receiver. The system also goes through the list of all other read-only colors that have already been allocated on the receiver to determine the closest match. Only if neither of these is "close enough", does the system allocate a new read-only color on the receiver.

FIG. 1 shows a diagram of two computer systems sharing a window. Referring now to FIG. 1, computer system 102 contains a display device 108 with a window 112 being displayed thereon. The display device 108 uses a first visual type, for example, direct color. A second computer system 104 contains a display device 110 with a window 114 being displayed thereon. The display device 110 uses a second visual type, for example, 8-plane pseudo color, so the first visual type has many more colors that the second visual type. The computer system 102 and the computer system 104 are connected through a network 106, which is typically a local area network, however, any type of network will suffice. Within the system shown in FIG. 1, the window 112 and the window 114 are being shared between the computer systems, such that all the data displayed within the window 112 will also be displayed within window 114. Each time data is displayed within the window 112, by an application program running on the system 102, the system of the present invention translates the color of each pixel of the data being displayed in window 112 into a corresponding pixel color for the computer system 104. The system then sends the translated pixel over the network 106 where it is displayed within the window 114 by the computer system 104.

Figure 2:
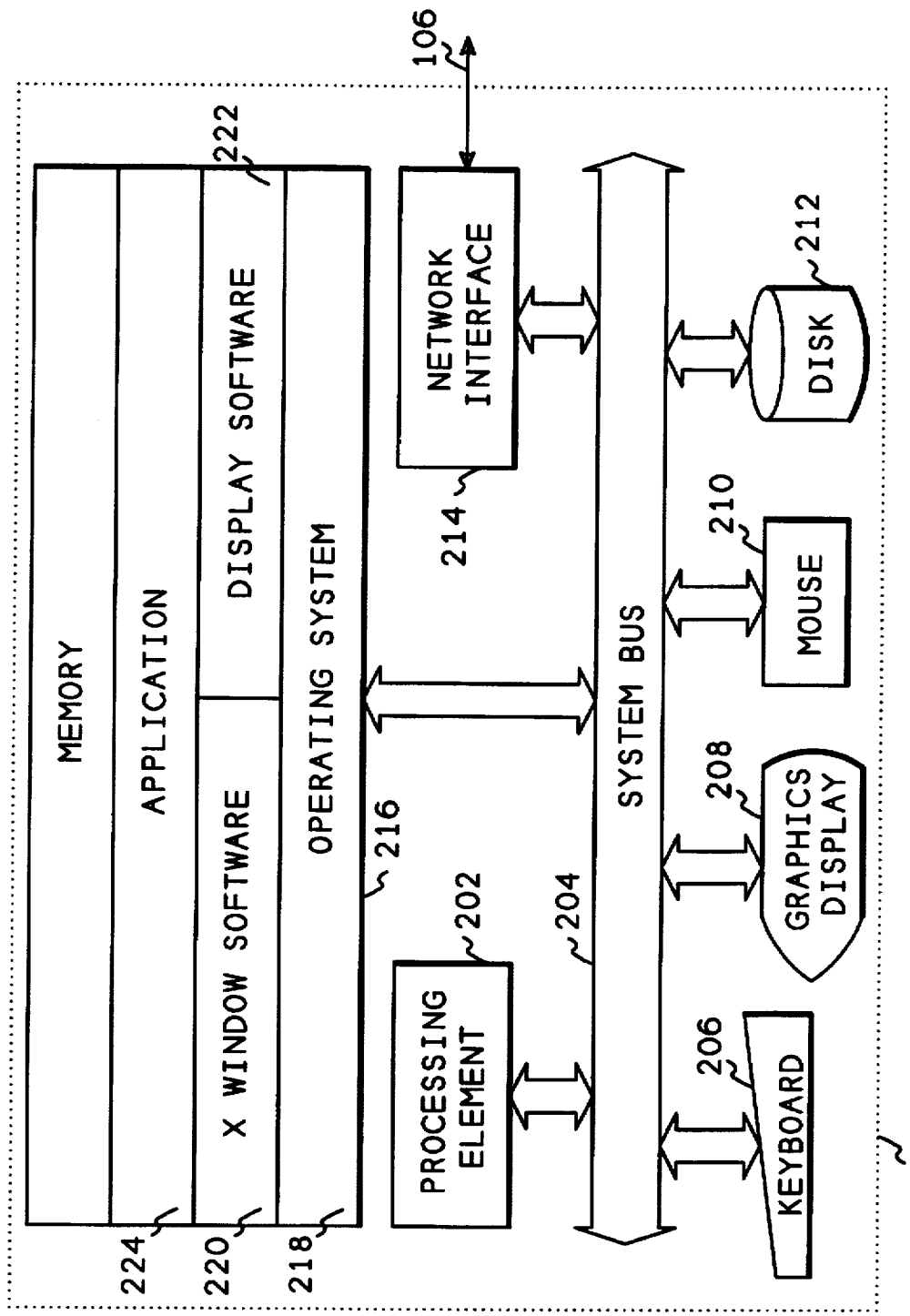
FIG. 2 shows a block diagram of a computer system containing the present invention.

FIG. 2 shows a block diagram of the computer system 102. This block diagram could also be the same as the block diagram for computer system 104. Referring now to FIG. 2, the computer system 102 contains a processing element 202 which communicates to other elements of the computer system 102 over a system bus 204. A keyboard 206 allows text input to the computer system 102 and a mouse device 210 allows graphical data input to the computer system 102. A graphics display 208 allows data to be output by the computer system 102, including the shared windows of the present invention. The graphics display 208 may include a separate graphics controller card and display, or these may be combined. A disk 212 contains data and software of the present invention, and a network interface 214 provides the electronics necessary for the computer system 102 to communicate to the computer system 104 over the network 106.

A memory 216 contains an Operating System 218 used by the present invention. Window software 220 is used by the present invention to display windows within the graphics display 208, and the display software 222 contains the pixel translation software of the present invention. An application program 224 displays the windows through the display software 222 on the various displays of the various computer systems.

Figure 3:
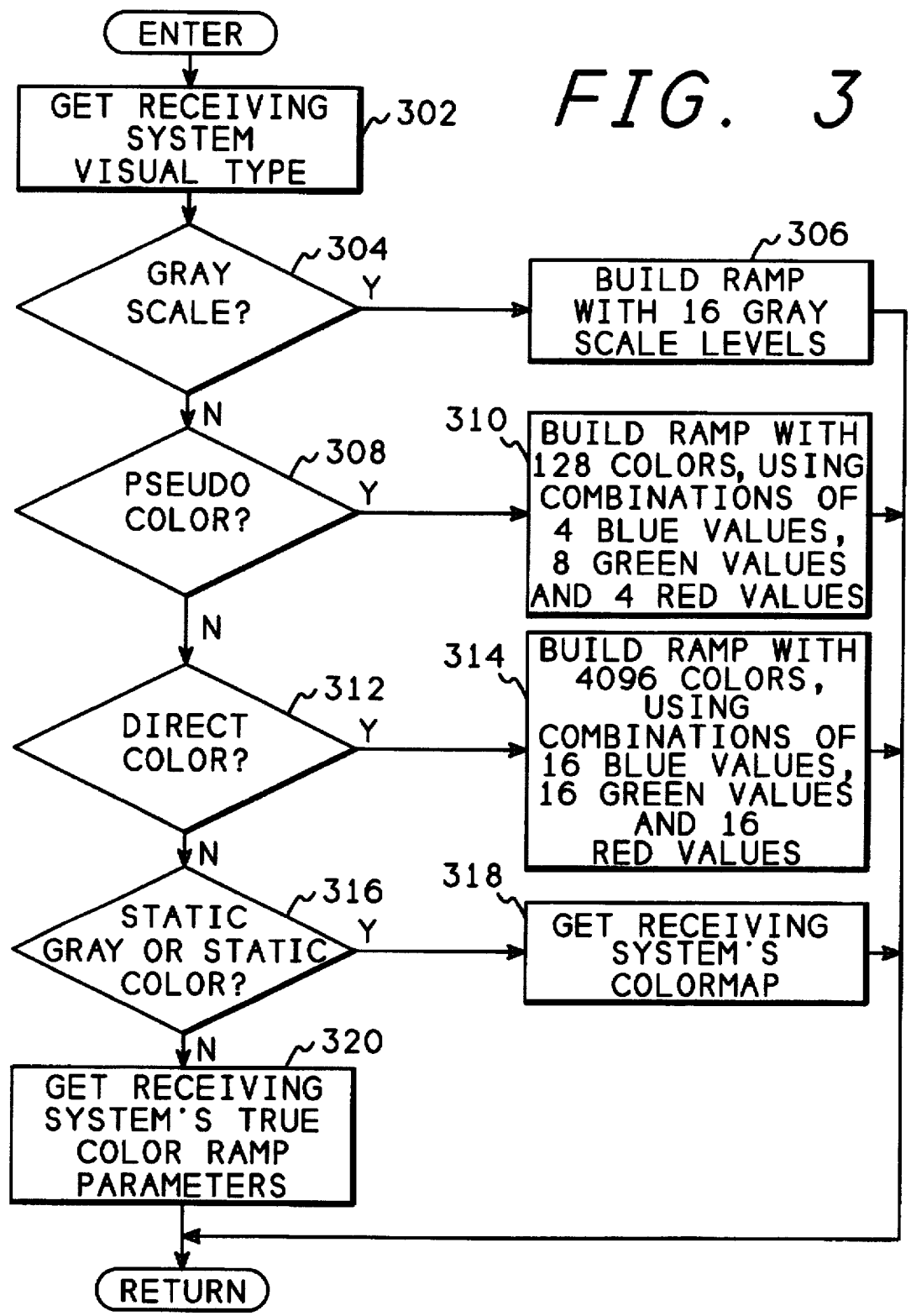
FIG. 3 shows a flowchart of the process of the invention that makes initial connection between the shared windows.

When a user of one of the computer systems requests that a window be shared, the display software system 222 calls FIG. 3 of the present invention to allocate a color ramp on the receiving system. Referring now to FIG. 3, after entry, block 302 asks which visual type is being used on the receiving system, by sending a request through the network 106 (FIG. 1). Block 304 then determines whether the visual type is gray scale and if so, transfers to block 306. Block 306 builds a ramp having half of the number of levels within the receiving system's colormap, up to a maximum of sixteen. Typically, the receiving system's colormap for a gray scale device may have 256 entries, thus, block 306 uses very few of those entries to build the ramp. No more than sixteen entries are used since the appearance is good with only sixteen entries, and many cells are left unchanged in the color map. After building the gray scale ramp, block 306 returns to the display software 222.

If the receiving system's visual type is not gray scale, block 304 transfers to block 308 which determines whether the receiving system has a pseudo color visual type with at least 256 colors. If so, block 308 transfers to block 310 which builds a ramp having 128 colors within the receiving system. This ramp uses combinations of four blue values, eight green values, and four red values to create 128 different entries within the ramp for the receiving system. As discussed above, eight plane pseudo color has a map with 256 entries, therefore, the ramp uses half these entries.

If the receiving system is not pseudo color, block 308 transfers to block 312 which determines whether the receiving system is using direct color. If so, block 312 transfers to block 314 which builds a color ramp having 4096 colors in the receiving system. This ramp uses combinations of sixteen blue values, sixteen green values, and sixteen red values.

If direct color is not being used, block 312 transfers to block 316 which determines whether static gray or static color is being used. If either of these is being used, block 316 transfers to block 318 which gets the receiving system's colormap. Since static gray or static color is being used in the receiver, no new colors can be allocated, so the only processing that can be done is to find the color that most closely matches a color already allocated in the receiver. Therefore, getting the receiving system's colormap will allow the pixel translation to be performed.

If none of these are being used, the receiving system must be using a true color visual type, so block 316 transfers to block 320 which gets the receiving system's true color ramp parameters, such as how many bits are used to display each of the red, green, and blue values.

Figure 4:
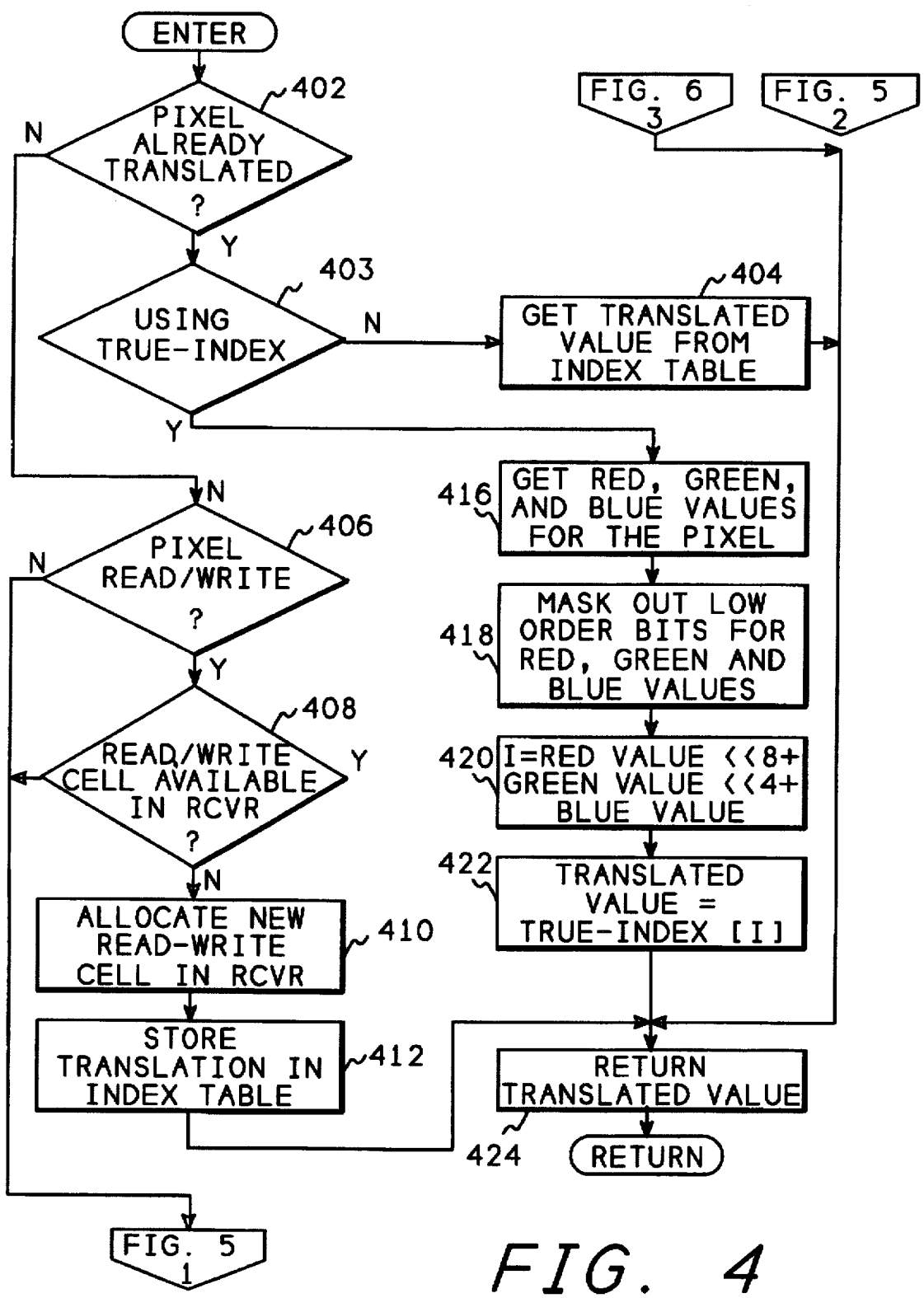
FIGS. 4–7 show a flowchart of the process of translating a pixel from the sending computer system display color to the receiving computer system display color.

Each time the application software 224 (FIG. 2) displays a pixel, the display request is made to the display software 222 (FIG. 2) which calls FIG. 4 of the present invention to translate the pixel into a matching color within the visual type of the receiver. Referring now to FIG. 4, after entry, block 402 determines whether the pixel has already been translated. This is done by accessing an index table or TRUE-INDEX at a position for this particular pixel to determine whether translated data exists at the position. An index table holds a translated value for each pixel that has been previously translated. The index table has an entry for each sender pixel value and the entry has the translated receiver color for the sender pixel value, if the pixel has been previously translated.

If translated data exists, control goes to block 403 which determines whether a TRUE-INDEX is being used. If a TRUE-INDEX is not being used, block 403 goes to block 404 which gets the translated data from the index table and then block 424 returns the translated value to the display software 222 which transmits it over the network interface 214 and the network 106 to the receiver for display.

The present invention builds a TRUE-INDEX whenever the sender's visual type is either a direct color or a true color and the receiver is not a true color visual type. For both these visual types, a large palette of colors is available for display, typically more than sixteen million colors. Therefore, an index table for this type of display would be extremely large (48 megabytes) and is impractical. However, with a color palette this large, a shaded image on this type of device will typically have many different pixels that are very close in color. Therefore, the resolution of the sender color can be reduced before mapping it to a receiver color. In the TRUE-INDEX, the present invention represents the red, green, and blue values of a color as four bits, using the highest order four bits of each of the red, green, and blue values. This provides sixteen levels of each of these colors, for a total number of possible color values of 16×16×16 or 4096. This set of colors is then mapped into a TRUE-INDEX, in the same manner as the index table described above.

If a TRUE-INDEX is being used, block 403 transfers to block 416 which gets the red, green, and blue values for the pixel. Block 418 then masks out the low order bits for these values, leaving the high order four bits for each. Block 420 then left shifts the red value by eight bits, left shifts the green value by four bits, and adds the three values together to form an index which block 422 then uses to index the TRUE-INDEX and retrieve the translated value. Block 424 then returns the translated value to the display software 222.

If the pixel has not yet been translated, block 402 transfers to block 406 which determines whether the pixel is a read-write pixel in the sender's colormap. If the pixel is a read-write pixel, block 406 transfers to block 408 which determines whether there is a read-write cell available in the receiver's colormap. If a read-write cell is available in a receiver's colormap, block 408 transfers to block 410 which allocates one of the read-write cells from the receiver's colormap, and stores the translation of this cell into the index table so that the next request to display this pixel will be satisfied by block 402 and block 404.

Figure 5:
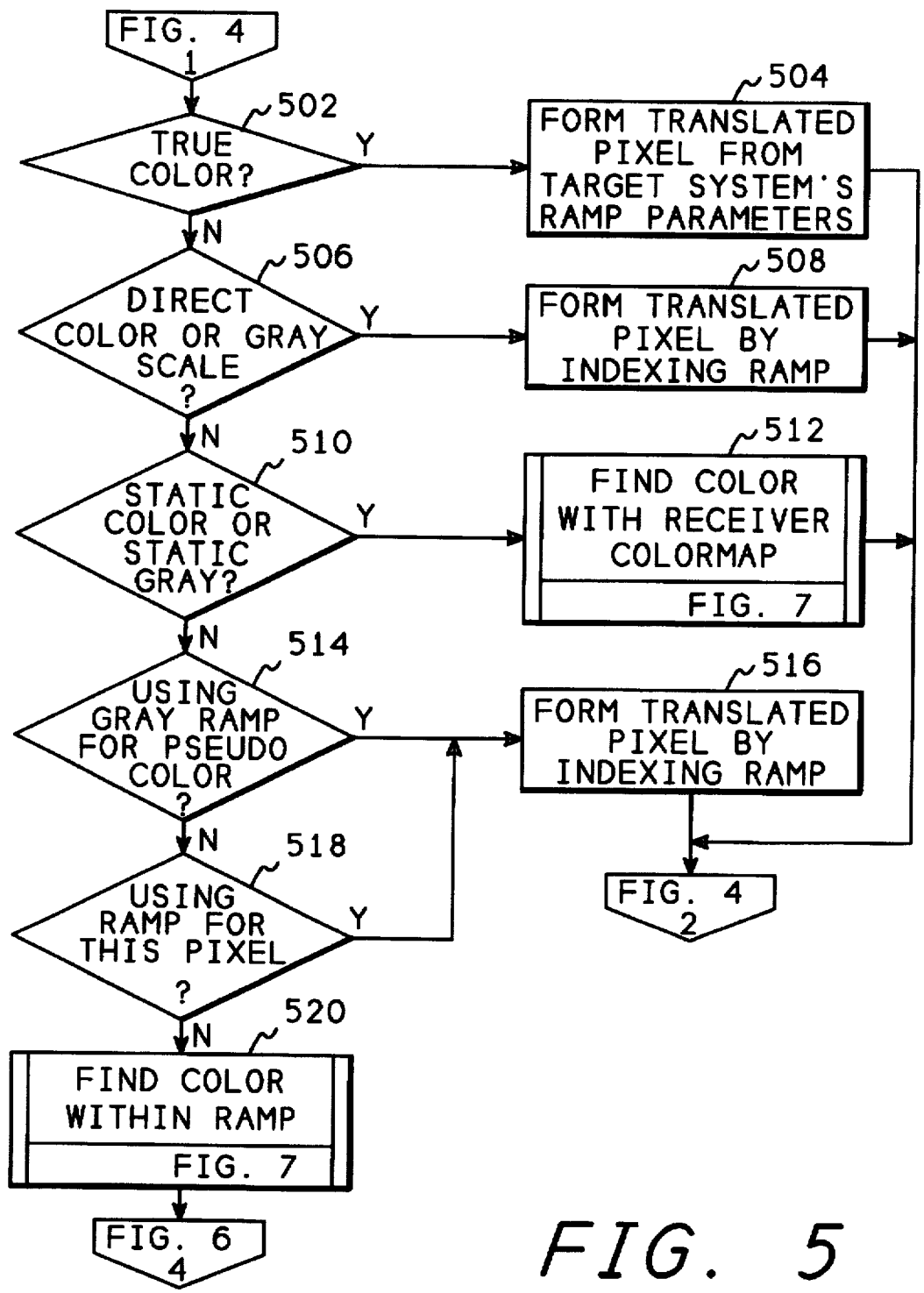

If the pixel is not a read-write pixel, or if no read-write cells are available in the receiver, control transfers to block 502 of FIG. 5. Block 502 determines whether the receiving system is a true color visual type, and if so, transfers to block 504 which forms a translated pixel from the receiving system's ramp parameters obtained from block 320 of FIG. 3.

If the receiving visual type is not a true color visual type, block 502 transfers to block 506 which determines whether the receiver uses a direct color or gray scale visual type, and if so, transfers to block 508 which forms a translated pixel by indexing the ramp built in FIG. 3.

If the receiver is not direct color or gray scale, block 506 transfers to block 510 which determines whether the receiver is a static color or a static gray, and if so, transfers to block 512. Block 512 calls FIG. 7 to find the closest color within the receiver's colormap. Since the receiving system is a static system, its colormap cannot be changed, therefore, the closest color returned from FIG. 7 is also returned to the display software 222 where it is sent to the receiver.

If the receiver is not static color or gray scale, block 510 transfers to block 514 which determines whether the receiving system is using a gray ramp for pseudo color. A gray ramp is used when the receiver is pseudo color but it has less than 128 available colors. Therefore, the best compromise is to translate the sending pixel into a gray scale value on the receiver, since less than 128 colors does not provide a sufficient color spread to allow a realistic color translation. When a gray ramp is being used, block 514 transfers to block 516 which forms the translated pixel by indexing the ramp formed in block 306 of FIG. 3.

If the receiving system is not using a gray ramp, block 514 transfers to block 518 which determines whether the ramp has already been used to translate this pixel color. If so, block 518 also transfers to block 516 which accesses the ramp to translate the pixel.

Figure 6:
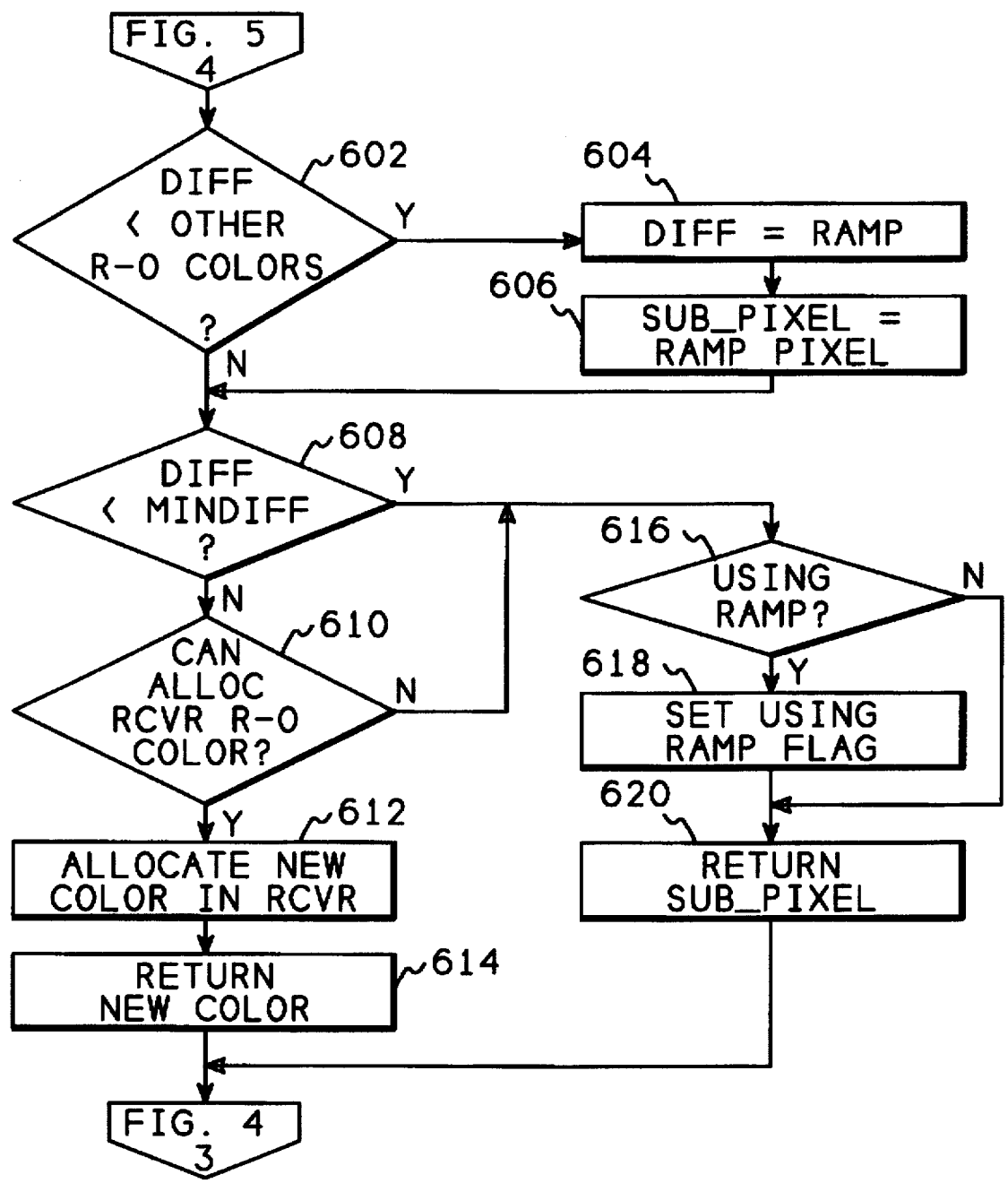
Figure 7:
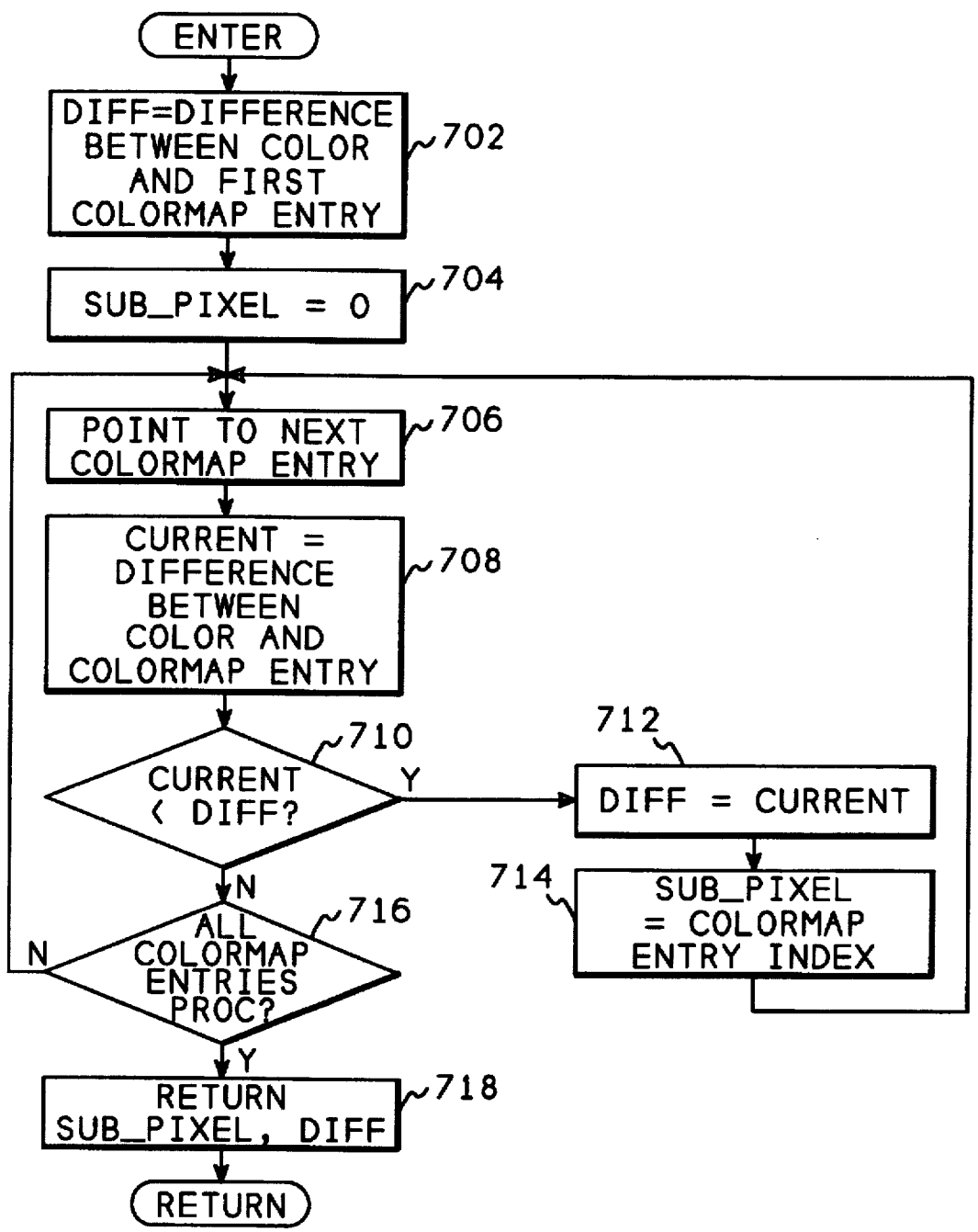

If the ramp has not been used for this color, block 518 transfers to block 520 which calls FIG. 7 to determine the closest pixel within the ramp portion of the receiver's colormap and then block 520 transfers to block 602 of FIG. 6.

Block 602 determines whether the difference determined by FIG. 7 is less than the difference between the color and other read-only colors that have been allocated in the receiver's colormap and if so, block 602 transfers to block 604 which sets the difference equal to the ramp color difference and then block 606 sets the ramp pixel into a variable SUB_PIXEL to be used in the translation. Control then goes to block 608 which determines whether the difference between the pixel being translated and an available pixel on the receiving system, that is, the ramp color found by FIG. 7 or one of the other read-only colors, whichever is closest, is less than a minimum difference value. That is, is this pixel "close enough" to a pixel within the receiving system to allow translation to that existing pixel. This is determined by the sum of squares method. Using this method, the actual red value is subtracted from the desired red value and squared. The actual green value is then subtracted from the desired green value and also squared. The actual blue value is subtracted from the desired blue value and squared. These three squares are then added together to create a difference value. This difference value represents how far the actual pixel is located away from the desired color for the pixel. In the present invention, "close enough" occurs when an available color is within approximately twenty percent of the distance between the available color and the next closest color. Also, the "close enough" distance around dark colors may be larger than the distance around light colors. For example the distance around dark colors may be twelve percent, whereas the distance around light colors may only be eight percent.

If the difference is less than the minimum difference, block 608 transfers to block 616, since the available color can be used. Block 616 then determines whether the ramp color or the read-only color was selected by block 602, and if the ramp color was selected, block 616 transfers to block 618 which sets the using ramp flag in the pixel, for use in subsequent translations. If the ramp is not being used, or after setting the ramp used flag, control transfers to block 620 which returns the SUB_PIXEL value set above in block 606.

If the difference is greater than the minimum difference, block 608 transfers to block 610 which determines whether the system can allocate a read-only color in the receiver's colormap. If not, the invention is unable to change the receiver's colormap, so the closest color must be used and block 610 transfers to block 616 to use the closest existing color.

If a read-only color cell is available in the receiver's colormap, block 610 transfers to block 612 which allocates the new color in the receiver's colormap, stores the desired color values in that location, and stores the translated value into the index table or TRUE_INDEX, whichever is being used, and sets an indicator in the index table or TRUE_INDEX that the color has been previously translated. Block 614 then returns this new translated value to the display software 222 which transfers it to the receiver's system.

FIG. 7 shows a flowchart of the find color process called from block 512 and block 520 of FIG. 5. Referring now to FIG. 7, after entry, block 702 sets a value DIFF to the difference between the desired color and the first entry in the receiver's colormap. Block 704 then sets the value of the variable SUB_PIXEL to zero. Block 706 points to the next colormap entry, and block 708 sets the value of a variable CURRENT to the difference between the desired color and the colormap entry. Block 710 then determines if CURRENT is less than DIFF, and if so, transfers to block 712 which sets the value of CURRENT into the variable DIFF, and block 714 sets the value of this colormap entry into SUB_PIXEL before transferring back to block 706.

If CURRENT is not less than DIFF, block 710 transfers to block 716 which determines whether all colormap entries have been processed, and if not, block 716 transfers back to block 706 to process the next colormap entry. After all colormap entries have been processes, DIFF will contain the difference between the desired color and the best matching value, and the variable SUB_PIXEL will contain the best matching value. Block 718 returns these two values to FIG. 5.

Figure 8:
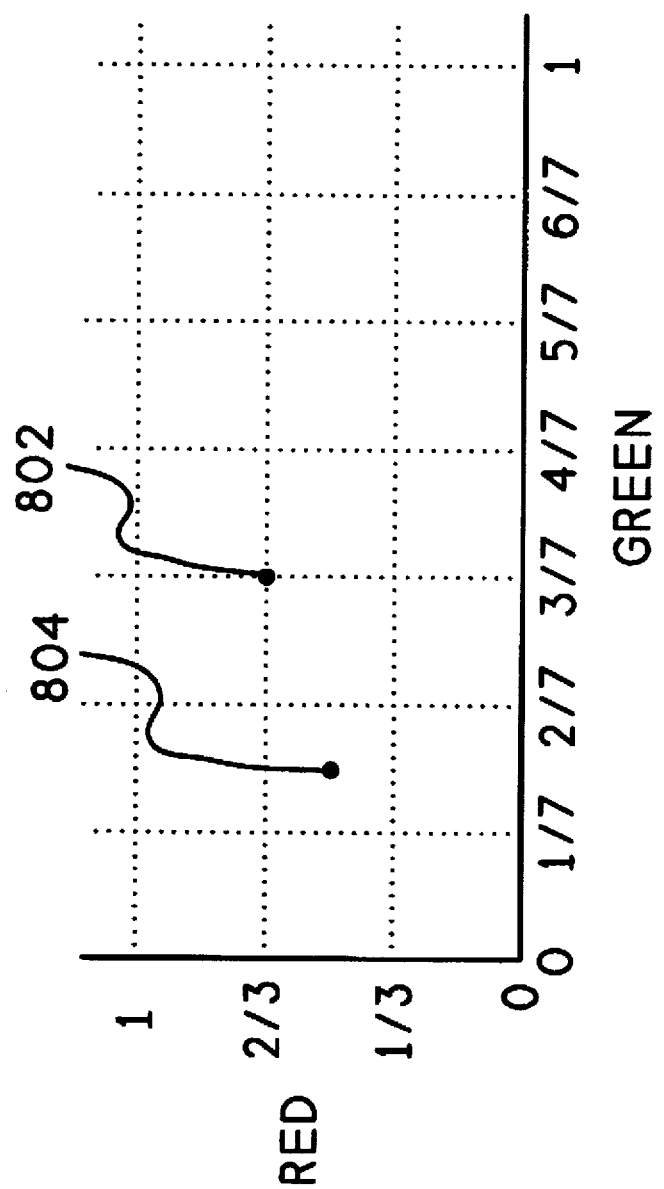
FIG. 8 shows a diagram illustrating closeness of colors.

FIG. 8 is a diagram illustrating color matching. This diagram illustrates the color space as a two-dimensional space using red and green, however, those skilled in the art will recognize that this is easily extended to three dimensions using red, green, and blue.

Referring now to FIG. 8, the red axis has four points, zero, $1/3$, $2/3$, and 1, and the green axis has eight points from zero to 1. A ramp color would be defined as the set of all of the intersections on the diagram. A pixel color 802 lies exactly on the point red ⅔ and green ⅜ so it is "close enough" to be able to use the ramp color red ⅔ and green ⅜ on the receiver. Pixel color 804, however, is too far from any of the ramp colors at the intersections. Therefore, when possible, a new color would be allocated in the colormap for pixel color 804.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for translating a color used in a first visual type to a color in a second visual type, said computer implemented method comprising the steps of:

(a) allocating a ramp of a plurality of colors in a colormap of said second visual type, wherein said allocated ramp colors are evenly spaced within a color palette of said second visual type, and wherein said allocated ramp colors comprise fewer than all available colors in said colormap of said second visual type;

(b) selecting one of said used colors from said first visual type;

(c) comparing said selected used color to each allocated ramp color and to all additional colors previously allocated in said colormap to select a one of said allocated colors close to said selected used color;

(d) determining a difference between said selected allocated color and said selected used color;

(e) when said difference is less than a predetermined amount, using said selected colormap color as a translated color;

(f) when said difference is more than said predetermined amount, allocating an additional color in said colormap of said second visual type, wherein said additional color has palette values related to said selected used color, and selecting said additional color as said translated color;

(g) sending said translated color to said second visual type; and (h) repeating steps (b) through (g) for each color used in said first visual type.

2. The computer implemented method of claim 1 wherein step (f) further comprises the step of:

(f1) when all available additional colors in said second visual type have been allocated, using said selected allocated color as said translated color.

3. The computer implemented method of claim 1 wherein step (b) further comprises the following step (b1), step (f) further comprises the following step (f1), and step (g) further comprises the following step (g1):

(b1) selecting a used color of a first class from said first visual type;

(f1) allocating said additional color in said colormap of second visual type as being of a same class as said first class; and (g1) repeating steps (b) through (f) for each color used within each class of colors in said first visual type.

4. The computer implemented method of claim 1 wherein said allocated ramp colors comprise substantially half of all available colors in said colormap of said second visual type.

5. A computer implemented method for translating a color used in a first visual type to a color in a second visual type, said computer implemented method comprising the steps of:

(a) allocating a ramp of a plurality of colors in a colormap of said second visual type, wherein said allocated ramp colors are evenly spaced within a color palette of said second visual type, wherein said allocated ramp colors comprises less than all available colors in a colormap of said second visual type;

(b) selecting one of said used colors from said first visual type;

(c) when said selected used color has been previously translated, selecting a previously translated color as a translated color;

(d) comparing said selected color to each color of said allocated ramp colors and to all additional colors previously allocated in said colormap to select one of said allocated colors close to said selected used color;

(e) determining a difference between said selected allocated color and said selected used color;

(f) when said difference is less than a predetermined amount, using said selected allocated color as said translated color;

(g) when said difference is more than said predetermined amount, allocating an additional color in said colormap of said second visual type, wherein said additional color has palette values related to said selected color, and selecting said additional color as said translated color;

(h) retaining said translated color as said previously translated color for said selected color;

(i) sending said translated color to said second visual type; and (j) repeating steps (b) through (i) for all colors used in said first visual type.

6. The computer implemented method of claim 5 wherein step (g) further comprises the step of:

(g1) when all available additional colors in said colormap of said second visual type have been allocated, using said selected allocated color as said translated color.

7. The computer implemented method of claim 5 wherein step (b) further comprises the following step (b1), step (g) further comprises the following step (g1), and step (h) further comprises the following step (h1):

(b1) selecting a used color of a first class from said first visual type;

(g1) allocating said additional color in said colormap of said second visual type as being of a same class as said first class; and (h1) repeating steps (b) through (g) for all used colors in all classes of colors in said first visual type.

8. The computer implemented method of claim 5 wherein said allocated ramp colors comprise substantially half of all available colors in said colormap of said second visual type.

9. A computer implemented method for translating a color used in a first visual type to a color in a second visual type, wherein said first visual type displays colors using red, green, and blue values each of at least 4 bits in width, said computer implemented method comprising the steps of:

(a) allocating a ramp of a plurality of colors in a colormap of said second visual type, wherein said allocated ramp colors are evenly spaced within a color palette of said second visual type, wherein said allocated ramp colors comprises less than all available colors in a colormap of said second visual type;

(b) defining a true-index of a plurality of values in said first visual type, wherein said true-index comprises a first predetermined number of values;

(c) selecting one of said used colors from said first visual type;

(d) determining red, green, and blue values for said selected used color;

(e) reducing each of said red, green, and blue values to a reduced value comprising one of said first predetermined number of values;

(f) when said selected used color has not been previously translated, transferring to step (j);

(g) indexing said true-index using said reduced value and retrieving a true-index color from said true-index;

(h) determining a difference between said true-index color and said selected used color;

(i) when said difference is less than a predetermined amount, using said true-index color as a translated color and transferring to step (k);

(j) allocating an additional color in said colormap of said second visual type, wherein said additional color has palette values related to said selected used color, selecting said additional color as said translated color, and storing said additional color in said true-index as a previously translated color;

(k) sending said translated color to said second visual type; and (l) repeating steps (b) through (k) for each color used in said first visual type.

10. The computer implemented method of claim 9 wherein said first predetermined number of values is step (b) is 4096 and wherein step (e) further comprises reducing each of said red, green and blue values to 4 bits in width by removing low order values.

11. A computer implemented method for translating a color displayed in a first window of a first computer system using a first visual type into a color displayed in a second window of a second computer system using a second visual type, said computer implemented method comprising the steps of:

(a) upon connecting said first window to said second window, allocating a ramp of a plurality of colors in a colormap of said second visual type, wherein said allocated ramp colors are evenly spaced within a color palette of said second visual type, and wherein said allocated ramp colors comprise less than all available colors in said colormap of said second visual type;

(b) receiving a pixel for display in said first window, said pixel having a pixel color from said first visual type;

(c) when said pixel color has been previously translated, selecting a previously translated pixel color as a translated pixel color;

(d) comparing said pixel color to each allocated ramp color and to all additional colors previously allocated in said colormap to select a one of said allocated colors close to said pixel color;

(e) determining a difference between said selected allocated color and said pixel color;

(f) when said difference is less than a predetermined amount, using said selected allocated color as said translated pixel color;

(g) when said difference is more than said predetermined amount, allocating an additional color in said colormap of said second visual type in said second computer system, wherein said additional color has palette values related to said pixel color, and selecting said additional color as said translated pixel color;

(h) retaining said translated pixel color as said previously translated pixel color for said selected color;

(i) sending said translated color to said second visual type in said second computer system; and (j) repeating steps (b) through (i) so long as said first window remains connected to said second window.

12. The computer implemented method of claim 11 wherein step (g) further comprises the step of:

(g1) when all available additional colors in said colormap of said second visual type have been allocated, using said selected allocated color as said translated pixel color.

13. The computer implemented method of claim 11 wherein step (b) further comprises the following step (b1), and step (g) further comprises the following step (g1):

(b1) receiving a color of a first class from said first visual type; and (g1) allocating said additional color in said colormap of said second visual type as being of a same class as said first class.

14. The computer implemented method of claim 11 wherein said allocated ramp colors comprise substantially half of all available colors in said colormap of said second visual type.

* * * * *